(12) United States Patent
Yamamoto et al.

(10) Patent No.: US 10,703,404 B2
(45) Date of Patent: Jul. 7, 2020

(54) ELECTRIC POWER STEERING DEVICE

(71) Applicant: Mitsubishi Electric Corporation, Tokyo (JP)

(72) Inventors: Munenori Yamamoto, Tokyo (JP); Hiroshi Nishimura, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 260 days.

(21) Appl. No.: 15/554,763

(22) PCT Filed: Apr. 13, 2015

(86) PCT No.: PCT/JP2015/061363
§ 371 (c)(1),
(2) Date: Aug. 31, 2017

(87) PCT Pub. No.: WO2016/166797
PCT Pub. Date: Oct. 20, 2016

(65) Prior Publication Data
US 2018/0037252 A1 Feb. 8, 2018

(51) Int. Cl.
*B62D 5/04* (2006.01)
*H02P 7/29* (2016.01)
*H02P 29/68* (2016.01)
*B60L 1/00* (2006.01)

(52) U.S. Cl.
CPC .............. *B62D 5/046* (2013.01); *B60L 1/003* (2013.01); *H02P 7/29* (2013.01); *H02P 29/68* (2016.02)

(58) Field of Classification Search
CPC .... B62D 5/046; B62D 5/0481; B62D 5/0475; H02P 29/68; H02P 7/29; B60L 1/003

USPC ....................................................... 701/43, 41
See application file for complete search history.

(56) References Cited

U.S. PATENT DOCUMENTS

| | | | |
|---|---|---|---|
| 5,808,327 | A | 9/1998 | Maier et al. |
| 2004/0148079 | A1 | 7/2004 | Sugiyama et al. |
| 2005/0269151 | A1 | 12/2005 | Miyaura |
| 2008/0217095 | A1 | 9/2008 | Ono |
| 2011/0231064 | A1 | 9/2011 | Abe et al. |

(Continued)

FOREIGN PATENT DOCUMENTS

| | | |
|---|---|---|
| EP | 1 419 952 A2 | 5/2004 |
| EP | 1 602 555 A1 | 12/2005 |

(Continued)

OTHER PUBLICATIONS

Communication dated Jun. 24, 2019 issued by the Sate Intellectual Property Office of People's Republic of China in counterpart application No. 201580078427.6.

(Continued)

*Primary Examiner* — Nadeem Odeh
(74) *Attorney, Agent, or Firm* — Sughrue Mion, PLLC; Richard C. Turner

(57) ABSTRACT

In an electric power steering device, if a semiconductor switching element is used between a battery and a bridge circuit for opening and closing a current path, this arises a problem of generation of heat by an ON resistance; for this reason, a current flowing through the semiconductor switching element is limited if a difference between the gate voltage and the source voltage of the semiconductor switching element is smaller than or equal to a predetermined value.

3 Claims, 7 Drawing Sheets

(56) References Cited

U.S. PATENT DOCUMENTS

| | | | |
|---|---|---|---|
| 2014/0217940 A1* | 8/2014 | Kawamura | B62D 5/0484 |
| | | | 318/400.26 |
| 2014/0229066 A1 | 8/2014 | Harada | |
| 2015/0035464 A1* | 2/2015 | Maekawa | H02M 7/5387 |
| | | | 318/400.21 |

FOREIGN PATENT DOCUMENTS

| | | |
|---|---|---|
| EP | 2 377 744 A1 | 10/2011 |
| JP | 9-502335 A | 3/1997 |
| JP | 3375502 A | 2/2003 |
| JP | 2005-193751 A | 7/2005 |
| JP | 2007-290429 A | 11/2007 |
| JP | 2013-163515 A | 8/2013 |
| WO | 2005/081386 A1 | 9/2005 |

OTHER PUBLICATIONS

International Search Report for PCT/JP2015/061363, dated Jun. 30, 2015 (PCT/ISA/210).
Communication dated Oct. 5, 2018 from the European Patent Office in counterpart Application No. 15889135.8.
Communication dated Mar. 16, 2020 from the State Intellectual Property Office of the P.R.C. in Application No. 201580078427.6.

\* cited by examiner

ELECTRIC POWER STEERING DEVICE

CROSS REFERENCE TO RELATED APPLICATIONS

This application is a National Stage of International Application No. PCT/JP2015/061363 filed Apr. 13, 2015, the contents of all of which are incorporated herein by reference in their entirety.

TECHNICAL FIELD

This invention relates to electric power steering devices and, in particular, to an electric power steering device including a control unit that controls a current which is supplied to a motor from a power supply.

BACKGROUND ART

An electric power steering device is used as a unit that generates steering assist torque and configured so as to generate the torque by detecting the steering force of a driver with a torque sensor and controlling the magnitude and direction of a current, which is supplied to a motor, by a bridge circuit in response to the steering force, and a common configuration thereof includes, as principal constituent elements, a motor for assist, a power supply such as a battery, and a bridge circuit that supplies a current amount to the motor in response to the assist torque between the motor and the power supply.

In such a configuration, various techniques are developed and proposed. For example, WO 2005/081386 (PTL 1) deals with, as a problem, a situation in which, when the voltage of a power supply is boosted to a predetermined voltage value and then supplied to a motor, if a mechanical relay contact is used, discharge occurs between the relay contacts at the time of switching from ON to OFF and causes the relay contacts to be welded, which greatly affects the circuit operation, and proposes, as measures for preventing such a situation, monitoring the potential on the input side of the relay contact and performing control to turn the relay contact OFF if the value of a voltage difference between the input side and the output side of the relay contact drops below a predetermined threshold value. Since this proposition is based on the assumption that a mechanical relay contact is used as a relay contact, it may be possible to switch this relay contact from a mechanical relay contact to a semiconductor switching element. Such a configuration uses an N-channel semiconductor switching element as a relay as proposed in Japanese Patent No. 3375502 (PTL 2), for example, and turns ON/OFF a current which is supplied from a power supply by controlling the current flowing between the source and the drain by a gate voltage.

CITATION LIST

Patent Literature

[PTL 1] WO 2005-081386
[PTL 2] Japanese Patent No. 3375502

SUMMARY OF INVENTION

Technical Problem

However, in an electric power steering device, when a relay contact that interrupts a current which is supplied to a motor is configured as an N-channel semiconductor switching element as in PTL 2, in a state, for example, in which the voltage of a power supply such as a battery has decreased, a gate-source voltage becomes a certain value or less, and, if a current greater than or equal to a predetermined current value is passed in that state, the ON resistance suddenly increases, which causes a problem of a thermal fracture of the semiconductor switching element by heat loss caused by an increase in the ON resistance of the semiconductor switching element and the flowing current.

An object of this invention is to provide, in an electric power steering device, a stable operation by solving a thermal problem that arises when a semiconductor switching element is used as a current opening and closing unit performing ON/OFF of a current which is supplied to a motor.

Solution to Problem

This invention is directed to an electric power steering device in which a semiconductor switching element is used as an opening and closing unit that performs ON/OFF of a current which is supplied to a motor from a power supply and control is performed so as to limit a current flowing through the semiconductor switching element if a difference between the gate voltage and the source voltage of the semiconductor switching element is smaller than or equal to a predetermined value.

Moreover, this invention limits the current flowing through the semiconductor switching element of the opening and closing unit by adjusting a current which is consumed by using a bridge circuit that controls a current which is supplied to a motor.

Advantageous Effects of Invention

With the electric power steering device of this invention, by limiting a current that flows through a semiconductor switching element based on the gate-source voltage of the semiconductor switching element, it is possible to prevent a thermal fracture caused by the ON resistance of the semiconductor switching element.

DESCRIPTION OF EMBODIMENTS

Embodiment 1

Figure 1:
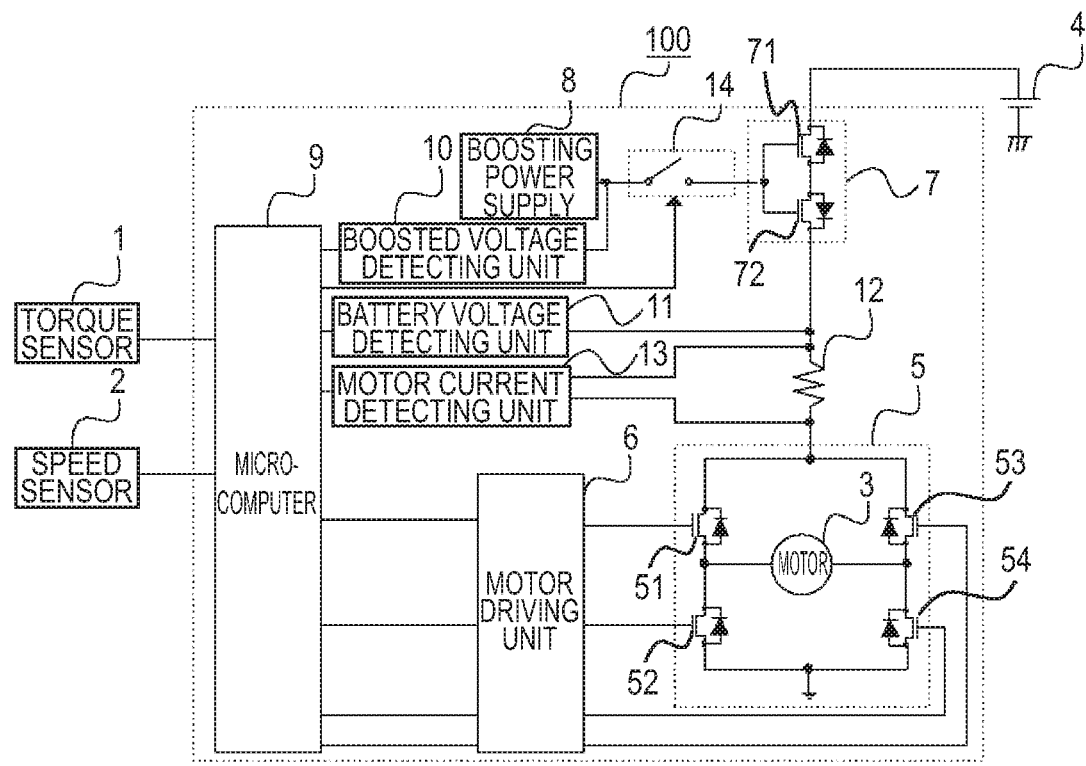
FIG. 1 is a circuit configuration diagram of an electric power steering, device of Embodiment 1 to which this invention is applied.

FIG. 1 is a circuit configuration diagram of an electric power steering device to which Embodiment 1 of this invention is applied.

As depicted in FIG. 1, an electric power steering device 100 generates torque that assists steering by controlling the magnitude and direction of a current which is supplied to a motor 3 based on the output of a torque sensor 1 and the output of a speed sensor 2.

As the motor 3, a DC brush motor is used here. The DC brush motor is configured so that forward and reverse driving thereof can be performed by changing the polarity of a voltage which is input thereto and starting torque, rotation torque, and so forth can be arbitrarily set by performing Duty ratio driving by using pulse-width modulation (PWM) driving.

Supply of a current to the motor 3 is provided from an external battery 4 via a bridge circuit 5, and control of the magnitude and direction of the current is performed as a result of a motor driving unit 6 controlling switching elements 51, 52, 53, and 54 constituting the bridge circuit 5. Supply and interruption of a current from the battery 4 to the bridge circuit 5 are performed by an opening and closing unit 7. The opening and closing unit 7 is configured with two semiconductor switching elements 71 and 72 connected in series and is configured so that a gate voltage from a boosting power supply 8 is applied to each gate.

Figure 2:
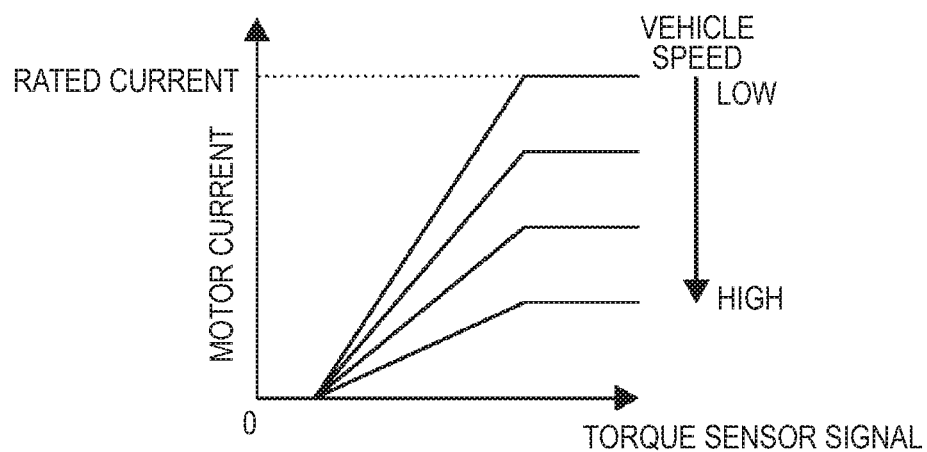
FIG. 2 is a diagram depicting the relationship between a torque sensor signal and a motor current for each vehicle speed.

It is to be noted that a microcomputer 9 is provided in this electric power steering device 100, the voltage value of the boosting power supply 8, the voltage value of the battery 4, and a motor current value which is supplied from the battery 4 are sent to the microcomputer 9 by a boosted voltage detecting unit 10, a battery voltage detecting unit 11, and a motor current detecting resistor 12 and a motor current detecting unit 13, respectively, and the microcomputer 9 is configured so as to control the overall operation of the electric power steering device 100 based on information from the above-described torque sensor 1 and speed sensor 2. That is, as a control device in the electric power steering device 100, the microcomputer 9 performs a computation of a target value of a motor current that assists steering based on a torque sensor signal from the torque sensor 1 and a vehicle speed signal from the speed sensor 2 as depicted in FIG. 2 and controls the motor driving unit 6 so as to obtain a target value of the computation result.

In the electric power steering device 100 with this configuration, from the gate voltage value (the voltage value of the boosting power supply 8) of the semiconductor switching elements 71 and 72 of the opening and closing unit 7, the source voltage value (the voltage value of the battery 4) of the semiconductor switching elements 71 and 72 of the opening and closing unit 7, a motor current detection value from the motor current detecting unit 13, and the drive Duty ratio at the time of PWM driving of the motor 3 in the bridge circuit 5, a battery current estimate Ib is calculated by the following expression (1).

$$Ib = Im \times Vb \times Duty \div Vb \qquad (1)$$

where

Ib: battery current estimate

Vb: battery voltage detection value

Im: motor current detection value

Duty: PWM duty ratio at which the bridge circuit is driven

Figure 3:
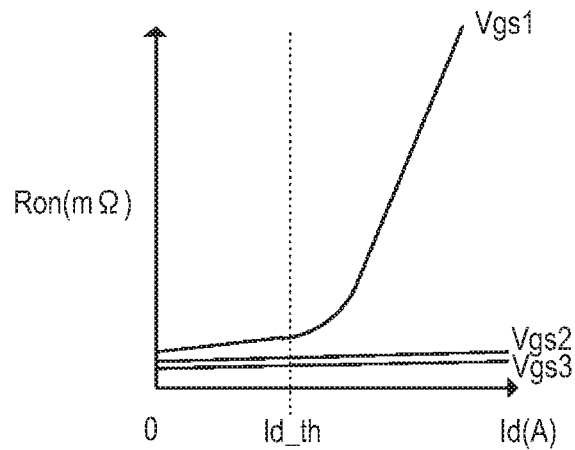
FIG. 3 is a diagram depicting the relationship between a current and an ON resistance of each of different gate-source voltage values of an N-channel semiconductor switching element at room temperature.

By using the calculated battery current estimate Ib, a battery current is limited so that the battery current estimate Ib is smaller than or equal to Id_th (a threshold value at which the ON resistance of the semiconductor switching element suddenly increases) depicted in FIG. 3.

Incidentally, FIG. 3 depicts the relationship between a current value flowing through the semiconductor switching element and an ON resistance value when the gate-source voltage value of the semiconductor switching element is varied, and indicates that, if the gate-source voltage value is Vgs1, an ON resistance value Ron suddenly increases when the current value reaches Id_th. Moreover, Vgs1, Vgs2, and Vgs3 indicate different gate-source voltage values, of which the voltage value of Vgs1 is smaller than those of Vgs2 and Vgs3.

Incidentally, a change in the ON resistance depends not only on the gate-source voltage value, but also on other parameters. For example, since it is known that the ON resistance increases at a rate of about 0.6%/° C. by a change in the environmental temperature, it is possible to treat a change by other parameters as distinguished from a change by the gate-source voltage value.

Moreover, the above-described expression (1) ignores a current that is consumed in a control system of the electric power steering device 100 as being extremely small; if the current that is consumed in this control system is also considered, the following expression (2) may be used.

$$Ib = Im \times Vb \times Duty \div Vb - Ie \div Vb \qquad (2)$$

where

Ie: battery current that is consumed in the control system of the electric power steering device Next, a system of the control system of Embodiment 1 of this invention will be described based on a flowchart depicted in FIG. 4.

Figure 4:
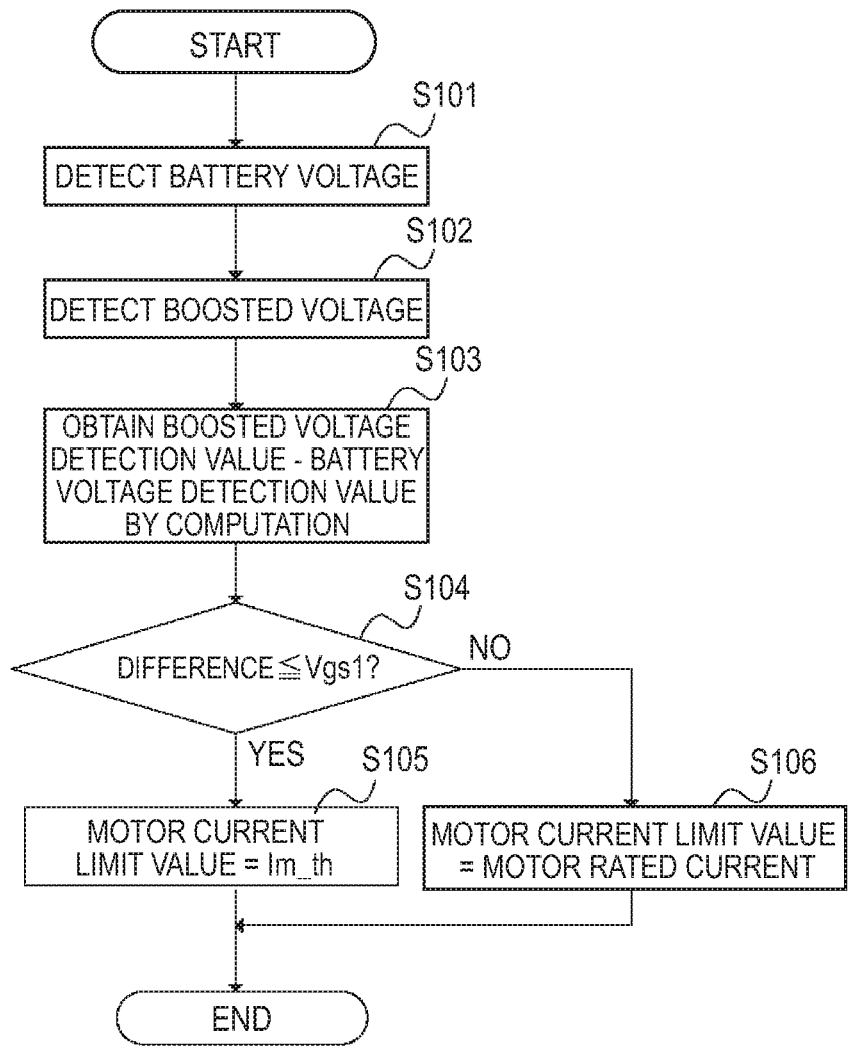
FIG. 4 is a diagram depicting a flowchart of Embodiment 1 of this invention.

The flowchart of FIG. 4 depicts the operation of the microcomputer 9, and the microcomputer 9 repeatedly executes this operation periodically.

In Step S101 of FIG. 4, by using the battery voltage detecting unit 11, the voltage value of the battery 4 is taken in by using an A/D converter (not depicted in the drawing) incorporated into the microcomputer 9, and Step S102 is then executed.

In Step S102, by using the boosted voltage detecting unit 10, the voltage value obtained by boosting a battery voltage with a booster circuit in the boosting power supply 8 is taken in by using the A/D converter incorporated into the microcomputer 9, and Step S103 is then executed.

In Step S103, based on the value of a difference between the boosted voltage detection value (the gate voltage of the semiconductor switching element 71 of the opening and closing unit 7) and the battery voltage detection value (the source voltage of the semiconductor switching element 71 of the opening and closing unit 7) taken in Steps S101 and S102 described above, the gate-source voltage which is being applied to the semiconductor switching element 71 is obtained by a computation, and Step S104 is then executed.

In Step S104, a determination is made as to whether or not the gate-source voltage value of the semiconductor switching element 71 obtained by a computation in Step S103 described above is smaller than or equal to the voltage value Vgs1, which is depicted in FIG. 2, with which the ON resistance increases; if the gate-source voltage value is smaller than or equal to the voltage value Vgs1, a determination is made that the gate-source voltage value of the semiconductor switching element 71 is low and "when the current flowing through the semiconductor switching element 71, that is, the battery current increases, the rate of increase of the ON resistance of the semiconductor switching element 71 is high", and the procedure proceeds to Step S105.

On the other hand, if the gate-source voltage value is greater than the threshold value, the rate of increase of the ON resistance of the semiconductor switching element 71 is low and the ON resistance does not suddenly increase, and a determination is made that "there is no need to limit the battery current", and the procedure proceeds to Step S106.

In Step S105, the motor current flowing through the motor 3 is limited so as to be smaller than or equal to a predetermined value Im_th by a relational expression indicated in the expression (1) so that the battery current becomes smaller than or equal to Id_th depicted in FIG. 2. Here, since the PWM Duty ratio of the switching elements 51, 52, 53, and 54 of the bridge circuit 5 that drives the motor 3 varies from 0 to 100%, if the PWM Duty ratio is assumed to be up to 100%, the threshold value Im_th of the motor current which is obtained by transforming the expression (1) is calculated as indicated in an expression (3).

That is, from the expression (1), $$Id\_th = Im\_th \times Vb \times \text{Duty} \div Vb$$

Here, if Duty is assumed to be 100%, $$Id\_th = Im\_th \quad (3)$$

Limiting the motor current to a motor current indicated in the expression (3) eventually limits the battery current so as to be smaller than or equal to Id_th.

On the other hand, in Step S106, since there is no need to limit the battery current, control is performed on the assumption that the motor current is smaller than or equal to a rated current.

As described above, by limiting the motor current when the gate-source voltage value of the semiconductor switching element 71 of the opening and closing unit 7 decreases, the battery current flowing through the semiconductor switching element 71 is limited, whereby it is possible to prevent a thermal fracture of the semiconductor switching element 71.

Embodiment 2

In Embodiment 1, by limiting the motor current which is supplied to the bridge circuit 5, the battery current is eventually limited; the battery current may be limited by limiting the Duty ratio of PWM driving by which the switching elements 51, 52, 53, and 54 of the bridge circuit 5 are driven.

Hereinafter, a system of a control system of Embodiment 2 will be described by using a flowchart depicted in FIG. 5.

Figure 5:
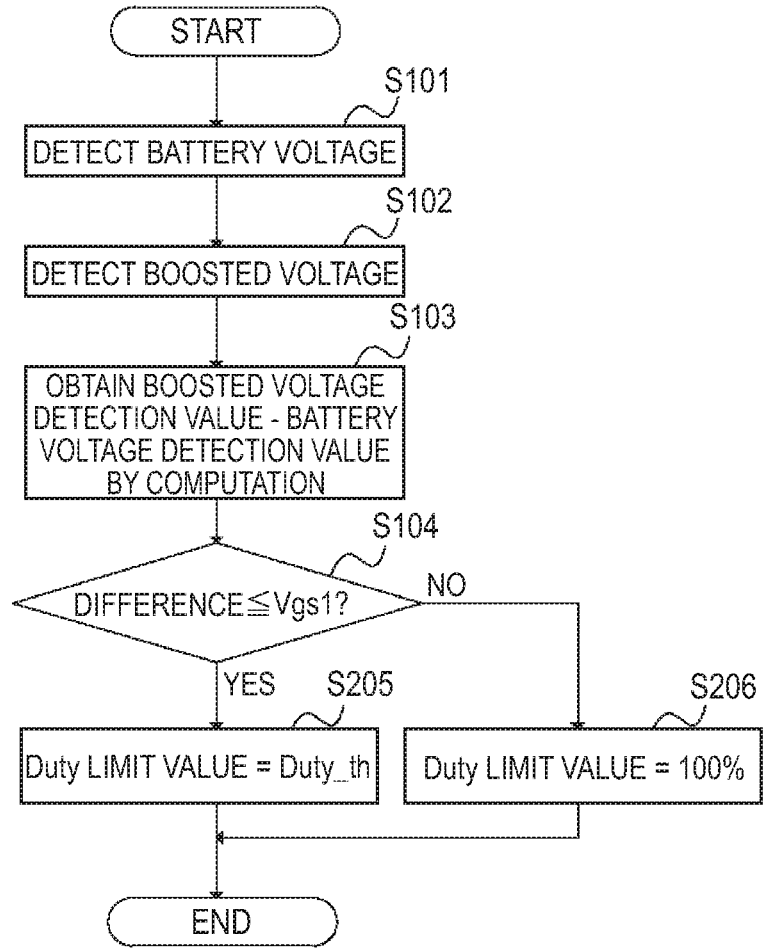
FIG. 5 is a diagram depicting a flowchart of Embodiment 2 of this invention.

Since the flowchart depicted in FIG. 5 is obtained by changing the flowchart depicted in FIG. 4 in such a way that the portions (Steps S105 and S106) which limit the motor current are replaced with portions (Steps S205 and S206) which limit Duty of PWM driving in the bridge circuit 5, these portions will be described.

In FIG. 5, in Step S104, if the gate-source voltage, that is, a difference between the gate voltage and the source voltage is smaller than or equal to Vgs1 (≤Vgs1), a determination is made that the gate-source voltage of the semiconductor switching element 71 is low and, when the current flowing through the semiconductor switching element 71, that is, the battery current increases, the rate of increase of the ON resistance of the semiconductor switching element 71 is high, and the procedure proceeds to Step S205.

On the other hand, if the gate-source voltage exceeds Vgs1 (>Vgs1), a determination is made that the rate of increase of the ON resistance of the semiconductor switching element 71 is low, that is, there is no need for limitation, and the procedure proceeds to Step S206.

In Step S205, the rated current of the motor 3 is substituted into the expression (1) as Im_max, and the limit value Duty_th of Duty is calculated as indicated in an expression (4).

That is, from the expression (1), $$Id\_th = Im\_max \times Vb \times \text{Duty}\_th \div Vb$$

By transforming this expression to an expression that obtains Duty_th, the expression (4) is derived.

$$\text{Duty}\_th = Id\_th \div Im\_max \quad (4)$$

Thus, by limiting the drive Duty ratio of the switching elements 51, 52, 53, and 54 as indicated in the expression (4), it is eventually possible to limit the battery current so as to be smaller than or equal to Id_th.

In Step S206, the drive Duty ratio of the switching elements 51, 52, 53, and 54 of the bridge circuit 5 is not limited (a limit value is set at 100%).

As described earlier, by limiting the drive Duty ratio of the switching elements 51, 52, 53, and 54 of the bridge circuit 5 when the gate-source voltage of the semiconductor switching element 71 of the opening and closing unit 7 decreases, the battery current flowing through the semiconductor switching element 71 of the opening and closing unit 7 is limited, which eventually makes it possible to prevent a thermal fracture of the semiconductor switching element 71 of the opening and closing unit 7.

Embodiment 3

Figure 6:
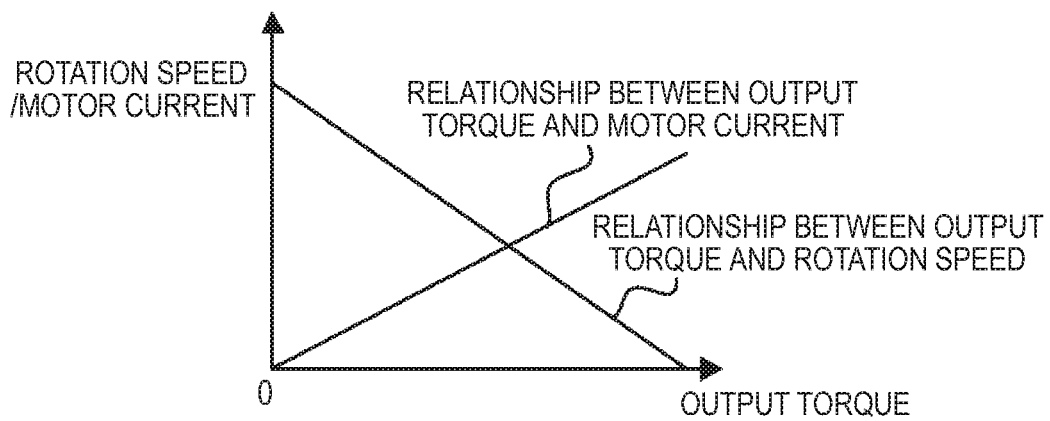
FIG. 6 is a diagram depicting the relationship between the output torque and the rotation speed of a DC motor and the relationship between the output torque and the motor current thereof.

As depicted in FIG. 6, the relationship between the output torque and the rotation speed of the motor 3 and the relationship between the output torque and the motor current thereof are as follows: the greater the output torque, the lower the rotation speed, and, the greater the output torque, the larger the motor current.

On the other hand, the motor current which is determined from the torque sensor signal of the electric power steering device 100 and the vehicle speed is generally as depicted in FIG. 2. That is, the lower the vehicle speed, the larger the assist current, and, the higher the vehicle speed, the smaller the assist current. That is, since, when the vehicle speed is low, the output torque of the motor 3 is more necessary than the speed at which the handle is steered, when the vehicle speed is high, the motor current which is originally necessary is small, and, at the time of, for example, emergency avoidance, the rotation speed of the motor 3 is required, by switching a means of limiting the battery current, the motor current or driving Duty, in accordance with the vehicle speed, it is possible to provide an electric power steering device on which fewer limitations in actual use are imposed.

Hereinafter, Embodiment 3 will be described by using a flowchart depicted in FIG. 7.

Figure 7:
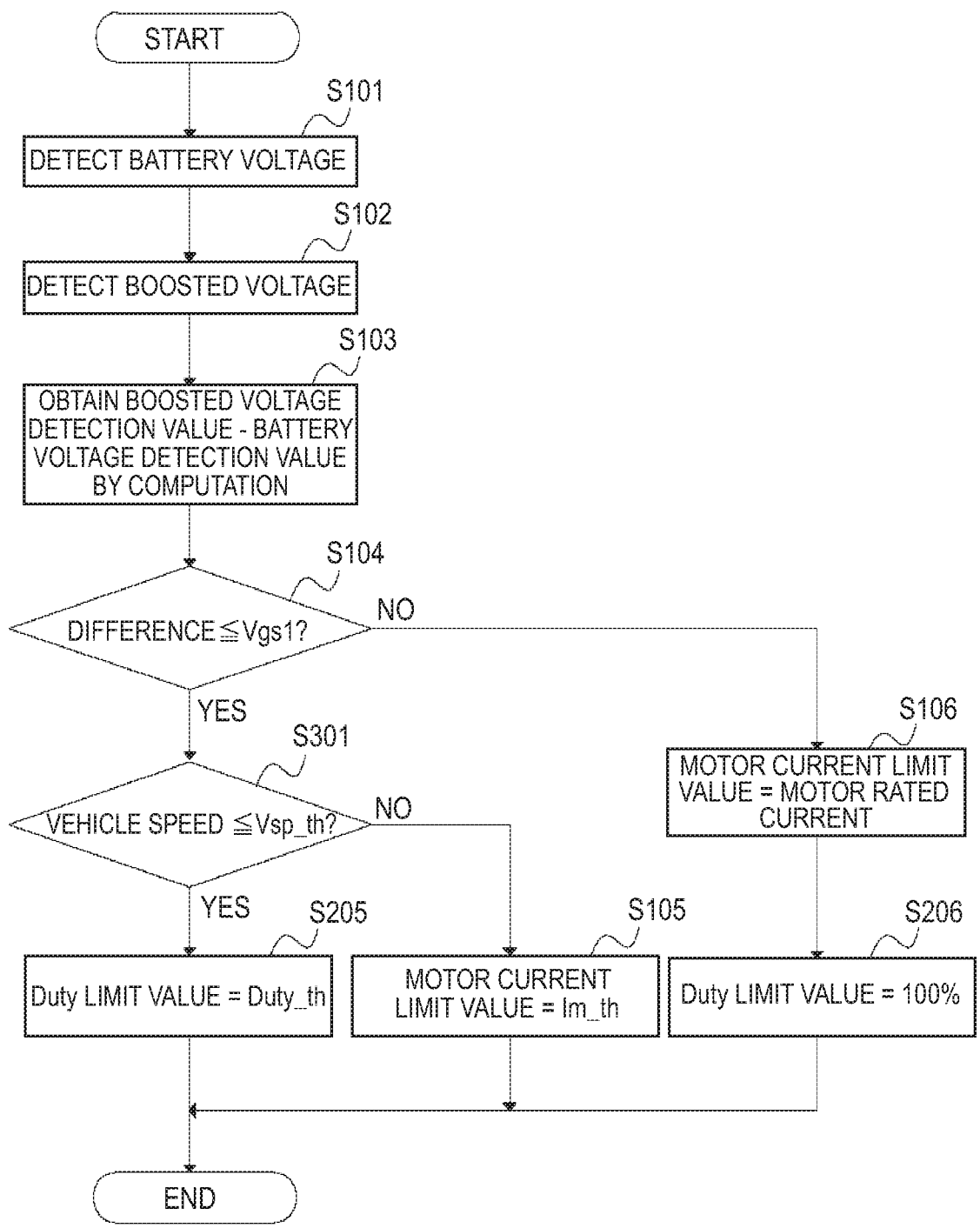
FIG. 7 is a diagram depicting a flowchart of Embodiment 3 of this invention.

Since the flowchart depicted in FIG. 7 is a flowchart corresponding to each of the flowcharts depicted in FIGS. 4 and 5 with Step S301 simply added therefrom, explanations of the portions already described in the above embodiments will be omitted.

In Step S104, if the gate-source voltage of the semiconductor switching element 71, that is, a difference between the gate voltage and the source voltage is smaller than or equal to Vgs1 (≤Vgs1), a determination is made that the gate-source voltage of the semiconductor switching element 71 is low and, when the current flowing through the semiconductor switching element 71, that is, the battery current increases, the rate of increase of the ON resistance of the semiconductor switching element 71 is high, and the procedure proceeds to Step S301.

On the other hand, if the gate-source voltage exceeds Vgs1 (>Vgs1), a determination is made that the rate of increase of the ON resistance of the semiconductor switching element 71 is low, that is, there is no need for limitation, and the procedure proceeds to Step S106.

In Step S301, if the speed detection value detected by the speed sensor 2 is smaller than or equal to a threshold value (Vsp_th) of the vehicle speed (≤Vsp_th) at which assist by the electric power steering device 100 is required, for example, when the output torque of the motor 3 is required in low-speed driving such as parking of an automobile in a garage, the procedure proceeds to Step S205, and, by limiting the drive Duty ratio of the switching elements 51, 52, 53, and 54 of the bridge circuit 5 by a Duty limit value such that the output torque of the motor 3 is not limited, it is possible to eventually limit the battery current flowing through the semiconductor switching element 71 of the opening and closing unit 7.

On the other hand, if the speed detection value is greater than the threshold value (Vsp_th) of the vehicle speed (>Vsp_th), the output of the motor 3 is not that required. However, while the automobile is being driven, there is a need for abrupt rotation of steering in a situation such as emergency avoidance,
when the rotation speed of the motor 3 is required, if the drive Duty ratio of the switching elements 51, 52, 53, and 54 of the bridge circuit 5 is limited, the required rotation speed cannot be obtained. Thus, the procedure proceeds to Step S105 and the motor current is limited.

As described earlier, by limiting the motor current or the semiconductor switching element 71 drive Duty ratio in accordance with the vehicle speed, it is possible to limit the battery current flowing through the semiconductor switching element 71 of the opening and closing unit 7 in such a way that fewer limitations in actual use are imposed and eventually prevent a thermal fracture of the semiconductor switching element 71.

Embodiment 4

Figure 8:
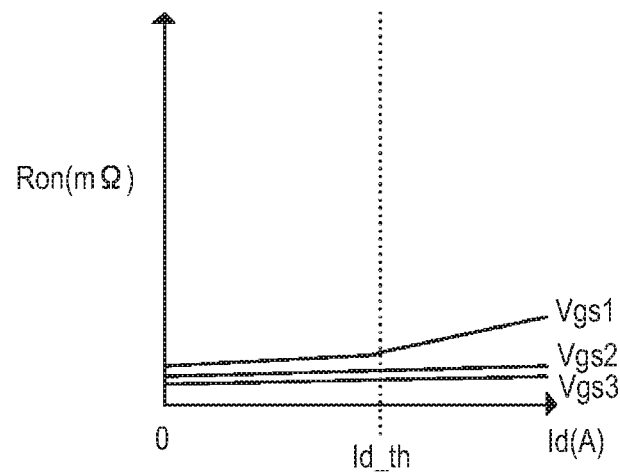
FIG. 8 is a diagram depicting the relationship between a current and an ON resistance of each of different gate-source voltage values of an N-channel semiconductor switching element at high temperature.

Though a minor difference may be caused depending on the gate-source voltage, the relationship between the current and the ON resistance of the semiconductor switching element 71 at high temperature varies as depicted in FIG. 8, for example.

Thus, in Embodiment 4, by incorporating a temperature detecting unit 15 into the electric power steering device 100 and changing the threshold value of the battery current by using temperature information detected by this temperature detecting unit 15, an electric power steering device on which fewer limitations are imposed is provided.

Figure 9:
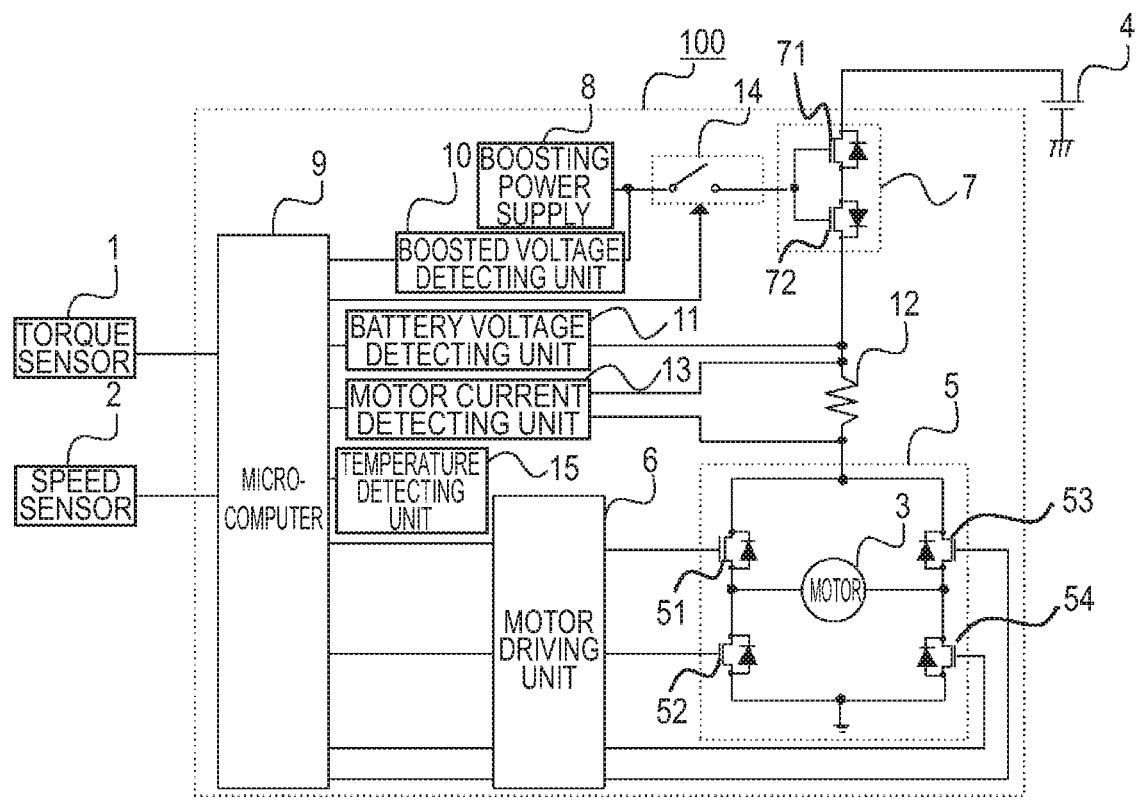
FIG. 9 is a circuit configuration diagram of an electric power steering, device of Embodiment 4 of this invention.

FIG. 9 illustrates the electric power steering device 100 of FIG. 1 to which the temperature detecting unit 15 that detects an internal temperature is added.

Hereinafter, an operation of the system obtained by adding the temperature detecting unit 15 to Embodiment 1 will be described by using a flowchart depicted in FIG. 10.

Figure 10:
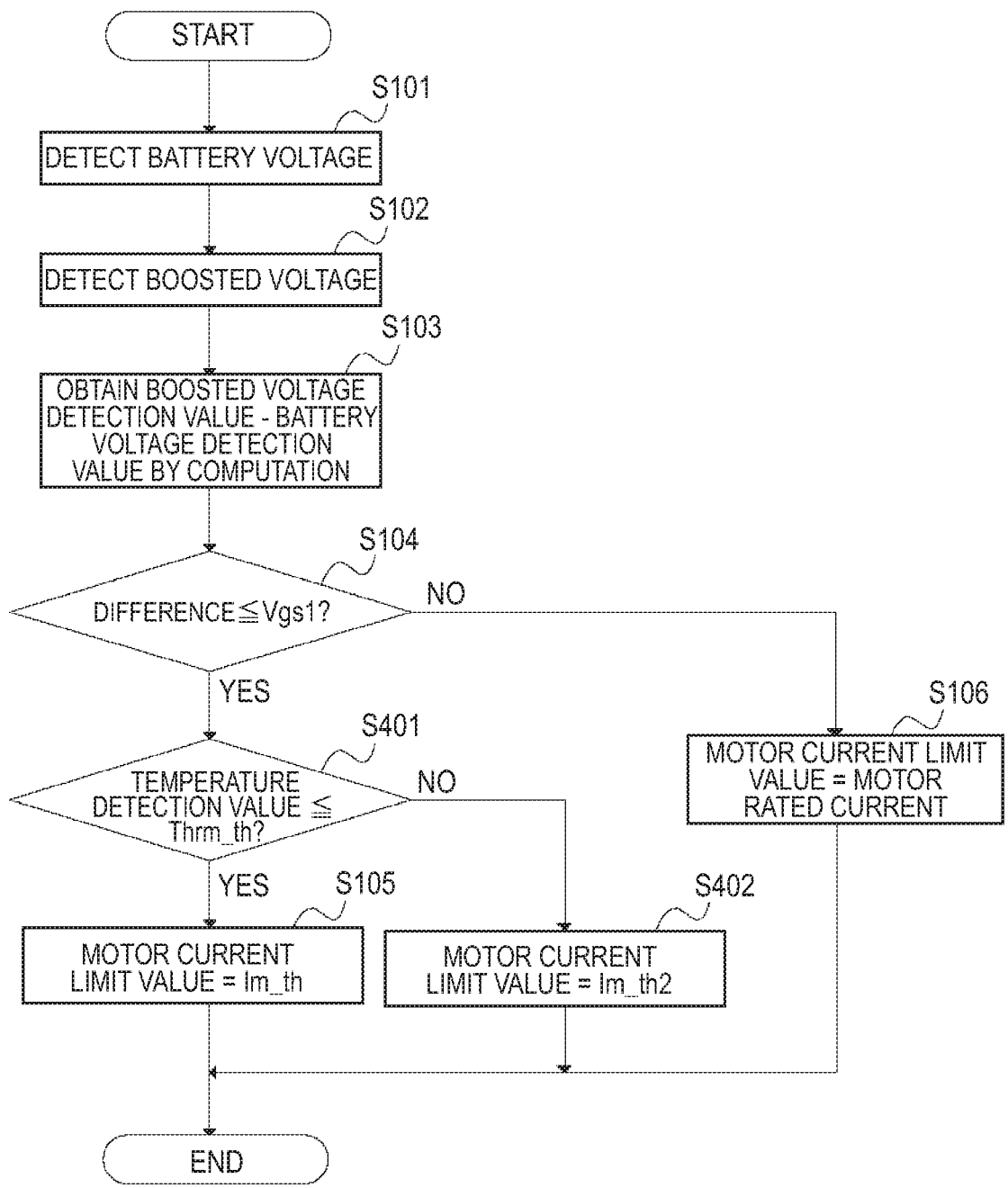
FIG. 10 is a diagram depicting a flowchart of Embodiment 4 of this invention.

The flowchart of FIG. 10 corresponds to the flowchart of FIG. 4 to which Steps S401 and S402 are added, and explanations of the portions already described in the above embodiments will be omitted.

In Step S104, if the gate-source voltage of the semiconductor switching element 71, that is, a difference between the gate voltage and the source voltage is smaller than or equal to Vgs1 (≤Vgs1), a determination is made that the gate-source voltage of the semiconductor switching element 71 is low, and, when the current flowing through the semiconductor switching element 71, that is, the battery current increases, the rate of increase of the ON resistance of the semiconductor switching element 71 is high, and the procedure proceeds to Step S401.

On the other hand, if the gate-source voltage exceeds Vgs1 (>Vgs1), a determination is made that the rate of increase of the ON resistance of the semiconductor switching element 71 is low, that is, there is no need for limitation, and the procedure proceeds to Step S106.

In Step S401, if the temperature detection value detected by the temperature detecting unit 15 is smaller than or equal to a threshold value (Thrm_th) of the temperature state Thrm_th), a determination is made that the ON resistance characteristics of the semiconductor switching element 71 depicted in FIG. 3 are adopted, the procedure proceeds to Step S105, and control of the electric power steering device 100 is performed by setting a limit value of the motor current at Im_th.

On the other hand, if the temperature detection value is greater than the threshold value (Thrm_th) of the temperature state (>Thrm_th), a determination is made that the switching characteristics depicted in FIG. 8 are adopted, the procedure proceeds to Step S402, and the motor current is limited by Im_th2 which is obtained by calculation from Id_th depicted in FIG. 8.

As described above, by performing control by switching the threshold value for determination about the motor current to a more suitable optimum value in accordance with the internal temperature of the electric power steering device, it is possible to limit the battery current flowing through the semiconductor switching element 71 of the opening and closing unit 7 in such a way that fewer limitations in actual use are imposed and eventually prevent a thermal fracture of the semiconductor switching element 71 of the opening and closing unit 7.

Figure 11:
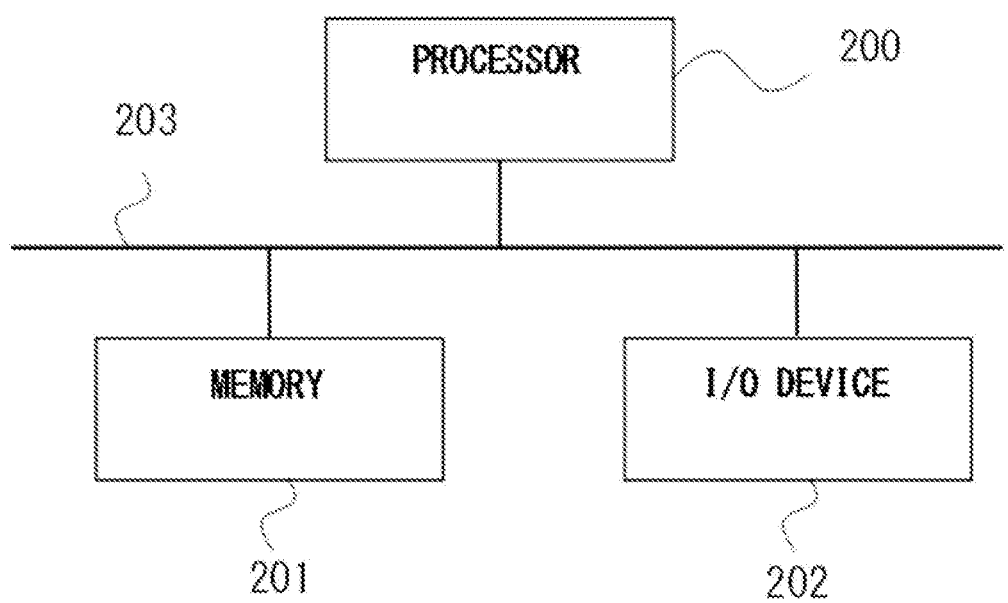
FIG. 11 is a hardware configuration diagram for realizing a block diagram according to an embodiment of the present invention.

Each of the functional blocks shown in the embodiments is realized by the microcomputer 9. The hardware of the microcomputer 9 is shown in FIG. 11. That is, a processor 200, a memory 201 for storing programs and data, and an input/output device 202 such as a sensor are connected via a data bus 203, and data processing and data transmission are performed under the control of the processor 200.

It is to be noted that this invention allows the embodiments to be arbitrarily combined or appropriately modified or omitted within the scope of the invention.

The invention claimed is:
1. An electric power steering device comprising:
a motor;

a bridge circuit that supplies a current to the motor and comprises a switching element;

an opening and closing unit that includes a semiconductor switching element and performs supply and interruption of a current to the bridge circuit from a battery by the semiconductor switching element; and a microcomputer that performs control so as to limit a current flowing through the semiconductor switching element when a difference between a gate voltage and a source voltage of the semiconductor switching element is smaller than or equal to a predetermined value, wherein the current flowing through the semiconductor switching element is limited by limiting a drive Duty ratio of the switching element when a vehicle speed is less than or equal to a threshold speed and by limiting a motor current when the vehicle speed is greater than the threshold speed.

2. The electric power steering device according to claim 1, wherein the current from the battery is limited in order to limit the current flowing through the semiconductor switching element.

3. The electric power steering device according to claim 1, wherein the current which is supplied to the motor by the bridge circuit is controlled in order to limit the current flowing through the semiconductor switching element.

* * * * *